United States Patent [19]

Ney

[11] Patent Number: 5,208,050

[45] Date of Patent: May 4, 1993

[54] MIXING ORIFICE EXTRUDER

[76] Inventor: Robert J. Ney, 4215 E. Bay Dr., Ste. 1103B, Clearwater, Fla. 34624

[21] Appl. No.: 363,132

[22] Filed: Jun. 7, 1989

[51] Int. Cl.$^5$ .......................... A23G 9/12; A23G 9/28; B29C 47/36
[52] U.S. Cl. ..................................... 425/202; 222/229; 222/386; 366/138; 366/194; 366/289; 366/308; 366/316; 425/225; 425/376.1
[58] Field of Search ............... 222/229, 231, 239, 386; 366/138, 184, 194, 196, 285, 286, 289, 308, 316; 425/200, 202, 225, 376.1, 382.3; 426/519

[56] References Cited

U.S. PATENT DOCUMENTS

| | | | |
|---|---|---|---|
| 1,249,403 | 12/1917 | Howard et al. | 366/138 |
| 4,391,575 | 7/1983 | Osrow | 425/464 |
| 4,668,561 | 5/1987 | Ney | 425/202 |
| 4,693,611 | 9/1987 | Verkler | 366/196 |
| 4,708,489 | 11/1987 | Carlson | 425/200 |
| 4,740,088 | 4/1988 | Kelly, Jr. | 366/138 |
| 4,755,060 | 7/1988 | Pedersen | 366/286 |
| 4,861,255 | 8/1989 | Ney | 425/202 |

FOREIGN PATENT DOCUMENTS 342536 10/1921 Fed. Rep. of Germany ...... 425/225
365422 12/1922 Fed. Rep. of Germany ...... 425/225

Primary Examiner—Jay H. Woo
Assistant Examiner—James P. Mackey

[57] ABSTRACT

A frozen yoghurt or ice cream dispensing system is presented. This system costs a small fraction that of the state of the art dispensing system, yet it is more versatile and puts out a better product, than the state of the art systems. A pre-formed "hard" frozen single serving of the base confection and fresh flavoring additives are loaded into an extrusion cup. At the actuation of a hand crank, or a power drive switch, a rotating cutter/-sweeper on a retractable shaft, penetrates the confection charge and chops, softens, and mixes it. After this cutter engages the bottom of said cup, a piston traverses the loading cup bore, and the charge is extruded through a multi-aperture orifice, at the bottom of the extrusion cup. Shearing and additional mixing occurs, during the interaction of the rotating cutter and the multi-aperture orifice. An automatic rinse cycle is also built into the device, to eliminate flavor mixing between various batches of confections, and to save labor.

6 Claims, 2 Drawing Sheets

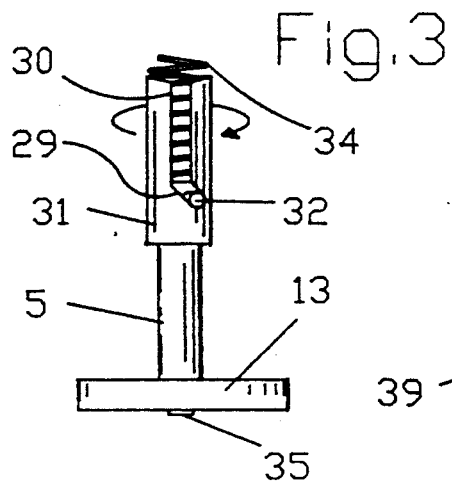
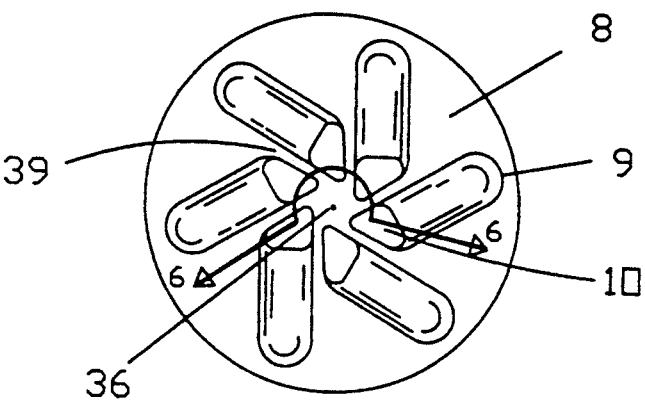
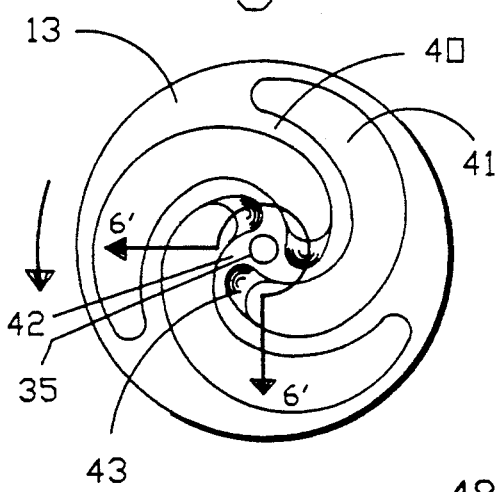
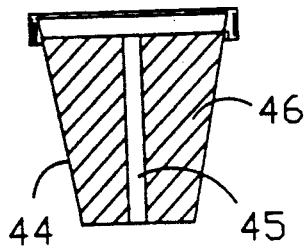
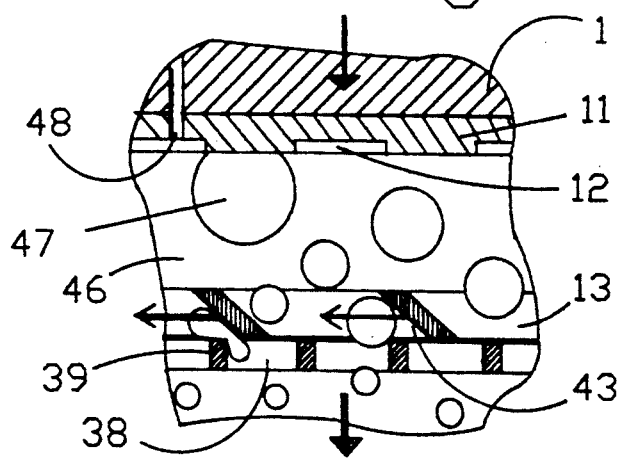

MIXING ORIFICE EXTRUDER

BACKGROUND OF THE INVENTION

Soft served frozen yoghurt has become very popular in the last few years, particularly due to its ice cream like taste, yet low cholesterol content. The original cost of a "soft-serve" dispenser is in the range of 5 to 15 thousand dollars, ranging from single flavor countertop models, to dual flavor floor models. These machines need frequent time consuming discharging and cleaning. These machines are also complex and are not without malfunction.

It is therefore desirable to devise a system costing a small fraction of the state of the art system, and provide a large number of flavors, that requires a small fraction of the present floor-space, that is easy to clean, stores the feed stock for several weeks, operates rapidly, and produces substantially the same quality product as the state of the art "soft-serve" machines. It is also desirable to accurately meter, to maintain feed-stock density, and to chop and mix in solid flavoring additives, and to require considerably less electric power; said apparatus should also be exceedingly simple to operate, and should be substantially free from malfunction.

There have been a relatively few (non refrigerated) conical screw operated frozen confection mixer extruders on the market for decades, that attempted to accomplish the above tasks, but for various operational reasons they have not become universally accepted.

The subject piston and cylinder extruder with a rotating agitator and a refrigerated pre-form loading system, can substantially meet the above requirements, except for the speed of operation. Cycle time is about equal to that of "scooping" cones.

At the present time, aggregate flavoring additions are typically placed on the top of the extruded frozen confection. It is desirable to mix fresh fruit, cookies, and candy bars into the base confection. This can be achieved with rotating and stationary cutters in said extrusion cup. The resulting confection is far superior in taste and consistency to any prior art frozen confection, since the fruit additions remain fresh, not frozen, and the cookie additions remain crisp, not soggy, as in pre-mixed frozen confections.

The Mixing Orifice Extruder produces a rich creamy product, since any residual ice crystals are broken up by a milling action, between the cutter-sweeper and the bottom of the extrusion cup. This action is similar to the action of the "drum and scraper" in a batch freezer, upon which the art of ice cream making is based on.

The Mixing Orifice Extruder was not intended to produce a homogeneous baby food like product, rather it will produce a "swirl" or "large aggregate" filled product. The flavor of a "large aggregate" filled product is much more intense than that of the same ingredients homogenized. The reason for this is, that as soon as the taste buds are "contaminated" with the pure aggregate, that intense taste will be retained at a high level long enough, till the next piece of aggregate is chewed up, and so on. A homogeneous soft-serve product may be obtained by feeding frozen homogeneous feed-stock into the extruder.

This extrusion may also be served on cones, since additions are mixed in, and will not fall off like aggregate toppings do.

The operation of this frozen confection "piston and cylinder" extruder is not critical, as far as over-softening of the product is concerned. The piston compression adds essentially no turbulence (or heat) to the charge; the only turbulence occurs at the extrusion orifice, which is slight. A separately driven agitator is needed only to soften the charge. Consequently, the Mixing Orifice Extruder needs only a 1/20 HP motor to drive the agitator, and has a relatively wide "time window" for the mixing and extruding process. With screw extruders, a significant amount of turbulence (heat generation) occurs along the entire length of the screw. Consequently, frozen confection screw extruders typically need a ½ to ¾ HP motor to drive the screw; at this power input the (non-refrigerated) process must be completed in a few seconds, or "melt-down" will occur.

The cost of the ingredients of frozen yoghurt, are about 60% that of premium (hard) ice cream; yet yoghurt is selling for about the same price as premium ice cream. The main reason for this is the amortization cost, of the large number of expensive single flavor soft-serve dispensing equipment needed. A new yoghurt shop, utilizing the Mixing Orifice Extruder, should be able to reduce the selling price by up to about half of the present price, and put out a more versatile and better product.

This invention is an improvement to the device in my U.S. Pat. No. 4,668,561, "Confection Mixing Chopping and Extruding Apparatus", issued May 26, 1987, and to the apparatus described in my co-pending application, Ser. No. 07/090,702, filed Aug. 27, 1987, now U.S. Pat. No. 4,861,255, "Mixing Orifice Extruder".

BRIEF DESCRIPTION

The subject device consists of a piston and a cylinder mounted on an arbor press like structure. The cylinder contains an extrusion orifice located at the center of its bottom surface. A rubber "O" ring seal is nested on the circumference of the piston, in the vicinity of its high pressure end. In the preferred embodiment of this invention, the piston and the cylinder are made of a high density and high impact resistant polymer; although stainless steel is also well suited for this purpose. Both piston and cylinder are bayonet mounted to the jaws of the press, for rapid manual take-down and assembly. A rotating cutter/sweeper may be mounted to a central retractable shaft for softening the confection and cutting, mixing and sweeping aggregate additions into the central extrusion orifice.

For the press actuation, a hand crank driven rack and pinion drive is preferred; this drive with a 23 to 1 mechanical advantage, works well for a 6 oz. feed-stock down to −5 degrees F. However, a screw and nut, a cam and roller, or a hydraulic system, are quite well suited for the embodiment of the drive mechanism.

In some applications a power drive is necessary, particularly if operating with a hard frozen feed-stock, when extremely high confection expansion ratios are required, or when more than 7 ounces of confection output is required. The preferred embodiment of the power drive is a standard commercial Acme threaded (power) screw and nut. The nut is mounted on the extrusion cup mount carriage, while the screw is mounted on two ball thrust bearings in a vertical position, and it is driven by an electric motor through a "vee" belt and pulley arrangement. The "vee" belt provides slippage at the belt to pulley interface, in case of an overload on the drive system. The motor is an electrically reversible one, with limit switches in the power feed line, at both ends of the carriage travel. For operator safety considerations, the control switch must be held with one hand, during the extrusion process; releasing the switch results in moving the carriage to the low or loading position. The other hand of the operator is presumably occupied with manipulating the receiver container or cone. A power driven cam, a motorized hydraulic press, or a power driven rack and pinion, are also suited for driving the carriage of said extrusion press. I have built power drives, with an Acme screw and nut, for the Mixing Orifice Extruder, that could extrude a 12 Oz. charge of yoghurt at as low as $-15$ degrees F. With an agitator in the extruder chamber, the resulting product can be in the temperature range of about 0 degrees F. to 20 degrees F., or higher, depending on the rate of extrusion.

It is emphasized that the ability to handle "hard" frozen feed-stock is an extremely important feature of this invention, since the storage time vs. temperature is an exponential function of temperature. At $-5$ degrees F. the confection will store for over one month. At the "holding" temperature of the typical "soft serve machine" (38 DEG. F. nominal), the confection will store for only 12 to 72 hours, depending on the agitation and temperature control of the machine. The 0 degree storage is particularly beneficial for some yoghurts, which contain a live culture of microbes, such as *Lactobacillus bulgaricus*, *Streptococcus thermophilus*, and *Lactobacillus acidophilus*.

The ability to handle sub-zero feed-stock is also advantageous, since "0" degree freezers are abundantly available in yoghurt or ice cream shops, and on the commercial market. Most of these freezers can be set to run down to $-10$ degrees F. Also, the operation is not critical with sub-zero feed stock, since it is far from the "melt-down" temperature range (above 24 degrees F.).

In order to be able to soften frozen confection, by the subject Mixing Orifice Extruder, the cutter must penetrate the confection charge. About 200 pounds of force is required on the cutter rotating at 30 RPM, to penetrate yoghurt at $-5$ degrees F. This force is readily available with the above described drives; however the spring loading of the retractable shaft is a problem at this force magnitude and deflection requirement. For this reason a torque actuated detent mechanism was devised, to keep the retractable drive shaft in the fully extended position, until the cutter contacts the bottom of the extrusion cup. A notch or a backward curve is placed at the bottom end of the key-way of the shaft drive barrel. The key pin on the drive shaft is initially captivated in this detent, while a considerable amount of torque is applied on the drive shaft, due to the rotating cutter engaging the charge in the extrusion cup. Initially the cutter on the drive shaft is locked in the fully extended position, and thus traverses through the confection charge. When it engages the bottom of the extrusion cup, a central protrusion on the cutter engages a central plug in the orifice. An axial force with substantially no torque is thus applied to the drive shaft. This force causes the detent mechanism to disengage. The extrusion orifice is made up of an array of individual apertures in the vicinity of each other, usually but not necessarily with a radial symmetry. The central plug is in the orifice, mainly to disengage the torque actuated detent mechanism. However, there are a number of other beneficial effects of the multiple aperture orifice. The central plug and its support structure tends to aerate the extruded stream, which is usually highly desirable. Past the multiple aperture orifice, the multiple streams fuse together. It is noted that this multiple aperture orifice, may be utilized for any state of the art confection extruders; this should be considered to be completely within the spirit and scope of this invention. The web like support structure of the central plug, also tends to shear the aggregate additions with the co-operation of the rotating cutter. Each individual aperture of said orifice is connected to a groove in the orifice plate in the bottom of the extrusion cup. The other end of these grooves, terminate near the cylindrical bore of the extrusion cup. The spokes of the cutter engage these grooves in the aperture plate, during the extrusion phase, and tend to mill, shear, and drive the aggregate additions to the extrusion apertures.

The multiple aperture orifice has considerably higher resistance to flow, than that of a state of the art orifice of the same flow area. This is highly beneficial for obtaining beyond the present state of the art cylinder pressures and confection expansion ratios, with normal size extrusion stream diameters. The MO Extruder is capable of producing beyond the state of the art confection extruder pressures and expansions, without liquefying the frozen confection.

The cutter/sweeper has curved spokes, which are substantially tangent to the outside diameter of the cutter, and on the other end, they are essentially tangent to the shaft of the cutter. The inter-spaces of the spokes form channels. These rotating spokes, with the co-operation of the groves in the aperture plate, tend to drive the aggregate additions to the central hub of the cutter. At the central hub, said channels terminate in an inclined plane structure, which structure highly resembles a marine propeller. The number of spokes correspond to the number of blades in said propeller. The propeller blades engage the multiple apertures of the orifice, during the extrusion phase, in order to shear, mix, and help drive the aggregates and the base confection through the extrusion orifice. Of course, the relatively high hydrostatic pressure of the charge in the cylindrical cup, and the resulting flow through the orifice, also tends to force the aggregates through the extrusion orifice.

In order to facilitate the rapid and hygienic loading of the extrusion cup, the base confection is stored in disposable cups, with covers. The confection may be squeezed out of these cups, without touching the charge by human hands; paper wrapped pre-forms are not as hygienic. Ordinary plastic drinking cups are utilized. The loading of the disposable cups may be accomplished by the shop operator from one "soft-serve" dispenser, or from a "batch freezer" (ice cream machine). If this is not available, other yoghurt shops are usually glad to sell their daily product in these cups, wholesale. Mass produced pre-formed stock should be available on the market, when there will be sufficient demand for it.

These storage cups have a truncated cone shape, and the charge can easily be squeezed out from the bottom, if air is allowed to enter the bottom of this cup. This may be accomplished several ways: holes or slots may be cut into the bottom region of the cup, just prior to the extraction process. A special tool may be used for this operation. An air passage-way may be formed into the confection charge, from the top of the cup to the bottom central region of the cup. This passage-way would also prevent the formation of a vacuum pocket, at the bottom of the disposable cup, at the extraction process. The disappearance of this passage-way, would also indicate the "melt-down" of the charge during storage or transportation.

For purposes of rapid rinsing of the extrusion chamber and cutter, between various flavor processings, and before periods of expected inactivity, "city" water is injected into the closed chamber, through a control valve. This is accomplished by placing a relatively small nozzle into the bottom face of the piston. A lever operated valve is used for rapid operation, a flexible hose and a dual self sealing quick disconnect coupling is used for the piston connection. Catch pan and drain line is utilized to carry away the wash water.

Quick release "bayonet" mounting of the piston and cylinder to the jaws of the press is used. The cutter is mounted on an integral 5 turn screw. These mounts facilitate rapid dis-assembly and assembly for daily soaking and major cleaning and lubricating of these components.

BRIEF DESCRIPTION OF THE DRAWINGS

FIG. 3 is a partial view of the cutter/sweeper and its retractable drive shaft (5), with the torque sensitive detent mechanism.

FIG. 4 is a top view of the orifice plate insert, with a multiple aperture orifice, and their associated grooves.

FIG. 5 is a bottom view of the cutter/sweeper, showing the spokes, channels, central propeller blades (43), and central protrusion (35).

FIG. 6 is a partial cross section of the piston, and a flat projection of the curved surfaces 6—6 and 6'—6', taken from FIG. 4 and FIG. 5 respectively, with components at their respective positions at the extrusion process, with confection charge and aggregates shown.

FIG. 7 is an elevational cross section of the disposable storage cup, with a central air hole in the charge.

DETAILED DESCRIPTION

Figure 1:
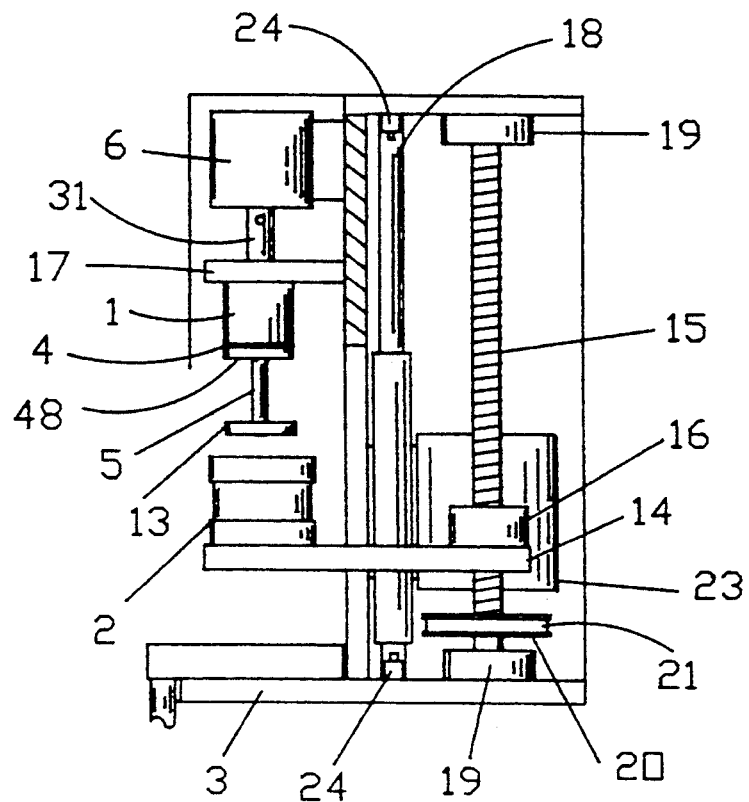
FIG. 1 is a side elevational view of the power screw driven extruder, with the side covers removed.
Figure 2:
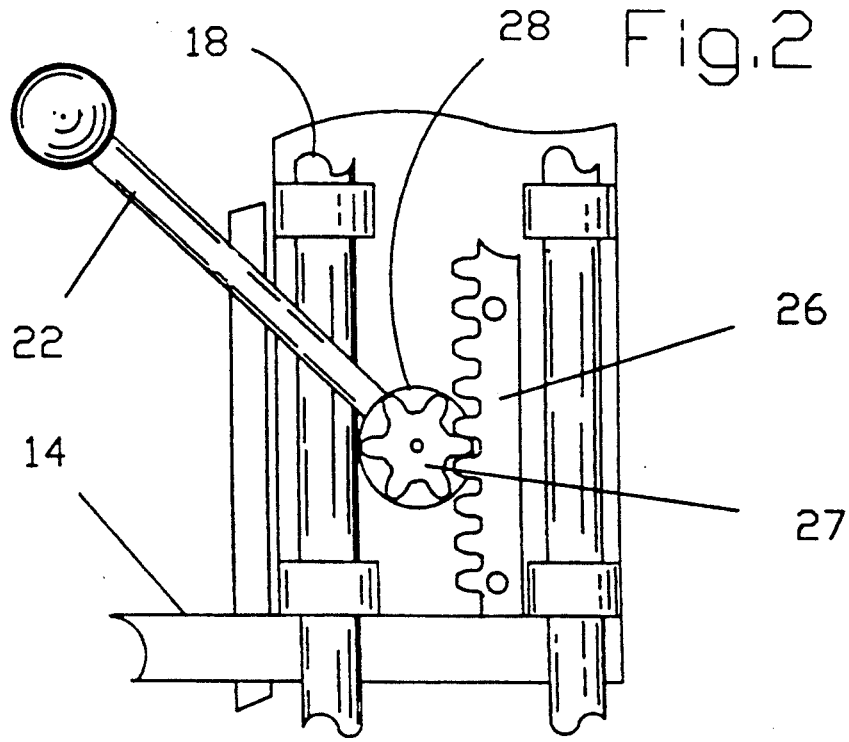
FIG. 2 is a partial side elevational view of the rack and pinion driven extruder; showing the details of the rack, pinion, crank, carriage, and carriage guide rods.

Referring now to the drawings, where like reference numerals refer to like parts throughout, reference is first made to FIG. 1: the mixing orifice extruder consists of piston 1 and cylindrical extrusion cup 2, mounted onto a custom built arbor press 3. Piston 1 is stationary, while cup 2 is mounted on a movable carriage 14. Piston 1 contains a groove with an "O" ring seal 4, on its circumference, in the vicinity of the bottom end of the piston. Piston 1 also has a central bore, for passing through retractable (cutter) drive shaft 5. This bore contains an internal groove with an "O" ring seal, near the bottom end of piston 1. In the preferred embodiment of this invention, piston 1 and cylindrical loading cup 2 are made of Polyvinyl Chloride; however numerous other high density, high impact and water resistant plastics or stainless steel, are well suited for fabricating piston 1 and cup 2. For quick release and assembly of piston 1 and cup 2, a bayonet mount to the jaws 14 and 17 of the arbor press 3 is utilized. The cutter/sweeper is mounted on an integral 5 turn screw. This facilitates the quick removal and re-assembly of the cup for confection loading, and for daily major cleaning and lubricating of these components.

The bottom of cup 2 is reinforced by stainless steel insert plate 8 containing grooves 9, and extrusion orifice 10. Similarly, the bottom or chamber end of piston 1, is reinforced by stainless steel insert plate 11, containing grooves 12. Insert plates 8 and 11 are bonded into a nest at their respective mating surfaces. The rotating cutter 13, is mounted on drive shaft 5, which is driven by drive barrel 31, which is keyed to the shaft of motor 6. When cutter 13 engages grooves 9 and 12 during the extrusion process, shearing action occurs between said grooves and said cutter. This is the reason for utilizing the stainless steel insert plates, plastics would not maintain the cutting edges.

For actuating arbor press 3, a hand driven rack and pinion drive is preferred. Rack 26 is mounted on extrusion cup carriage 14, and pinion 27 is attached to ball bearing supported shaft 28. The ball bearing supports are mounted on the frame of the extruder.

Commercial pinions, with several tons of force ratings are available, they can produce a mechanical advantage of 23:1 with a 10 inch long crank 22. These drives can extrude a 6 Oz charge, with a 1 inch multiple aperture orifice with said cutter and piston, using −5 degree F. feed-stock, at the application of a maximum of 20 pounds of force on the hand crank. A crank rotation of $2\frac{3}{4}$ revolutions is required for this operation. Experience indicates that this amount of force and cranking is not objectionable at all to the operators.

A 20 pound force input to the above described rack and pinion drive system, with low friction bearings, can result in a force output on the piston of about 400 pounds. This force on the 3 inch diameter piston, in a closed cylinder, will result in a gauge pressure of about 57 psi or about 4 atmospheres.

Power drives are indispensable for certain applications. These drives with their associated safety devices and reinforced press and extrusion cup, add considerable complexity and cost to the extruder. These extruders however, can extrude a "hard-serve" product at 0 degrees F. to 5 degrees F., starting with −25 degrees F. feed stock. No cutter/agitator is needed for the extrusion process in this case. In applications where total volume expansion of over about 100% (over-run) is required, such as flavored whipped cream like toppings, power drives are necessary to obtain the high included air pressures necessary for exceeding the above expansion. It is well known to those skilled in the art of making "whipped" confections, that a given confection can absorb only a limited amount of air bubbles; and the type of "non-pressurized" equipment used has only a second order effect on the amount of absorption at equilibrium. At equilibrium, the number of air bubbles formed is equal to the number of bubbles broken, due to agitation. This process is however not a function of the static gas pressure in the confection. Consequently, if this equilibrium occurs at 10 atmospheres of pressure, as the extruded stream exits the orifice, these included bubbles expand to 1 atmosphere and their volume increases 10 fold. Consequently, if for example 5% "new" high pressure air has been added to the confection, and it increases its volume 10 fold at expansion, the total theoretical expansion of the confection is 45%. Under actual conditions, some of the bubbles break at the extrusion orifice, so that the actual expansion is less than the theoretical. However, for the thin plate orifice used in the Mixing Orifice Extruder, this expansion loss is only a few percent. The temperature rise due to this compression is reversible, adiabatic cooling occurs at the orifice, due to the low turbulence expansion process.

Substantially the softening of the charge is accomplished by the relatively thin rotating cutter 13. Since the cutter 13 thickness is a factor of 10 smaller than the bore depth of cup 2, each element of the charge traversing it, will receive substantially equal amounts of agitation by cutter 13, at a constant velocity extrusion. This is not the case in small batch type screw extruders, where the screw and the charge lengths are about the same, since the front end of the charge traverses only a short section of the screw, while the back end of the charge traverses the entire length of said screw.

Power drives are also necessary if more than 7 ounces of yoghurt is required to be processed in one batch; since this exceeds the practical limits set for the manual operation: the maximum hand-crank force was limited to 20 pounds, the crank rotation to 2¾ revolutions, and the crank length to 10 inches. The preferred embodiment of the power drive utilizes an Acme threaded (power) screw 15, and Acme nut 16. Nut 16 is mounted on carriage 14, on which extrusion cup 2 is mounted.

Carriage 14 is guided on "low" friction linear bearings, and ⅝ inch or larger diameter steel shaft 18. Drive screw 15, is mounted on two thrust ball bearings 19, in a vertical position. A "Vee" belt pulley 20 is keyed onto drive screw 15, and it is driven by "Vee" belt 21, on "Vee" pulley on shaft of motor 23. It is imperative that such a slip capability, as that of the "Vee" belt and pulley, be incorporated into the drive train of the motor driven carriage; serious damage to the structure or to the motor may result, in the event of loading a charge beyond the capability of the extruder. Motor 23 power feed line is "critically" fused, so that in case of an overload the motor is doubly protected. Carriage travel limit switches 24, are mounted at the ends of carriage 14 travel. Motor 23 is electrically reversible and it is controlled by a so called "jogging" switch. Said switch is loaded to the carriage "down" position. One hand is needed to hold the switch for the extruder operation, while the other hand is presumably manipulating the receiver serving cup or cone.

In order for the extruder to soften the "hard" frozen confection, cutter 13 must first penetrate said confection; to exceed all practical force requirements, a design goal of 300 pounds force was established. The use of a 300 pound pre-loaded compression spring was ruled out, since it would be too large, and for a 3 inch deflection the force and energy requirements to further compress it, are prohibitive. For this reason a torque actuated detent mechanism was devised, to keep the drive shaft from retracting prematurely. A notch or backward (to the direction of rotation) curve 29 was placed at the bottom end of key-way 30, on drive shaft drive barrel 31. Key pin 32 on retractable drive shaft 5 is initially pushed into this backward curve 29, by pre-loaded compression spring 34. The pre-loading force of about 20 pounds is more than sufficient to overcome the largest drive shaft frictional forces developed during operation. When cutter 13 engages the confection charge, considerable torque is applied to drive shaft 5, and key-pin 32 is forced into the end of "backward" curve 29. This maintains drive shaft 5 in a fully extended position. When cutter 13 reaches the bottom of extrusion cup 2, a central protrusion 35 on cutter 13 engages, and is driven against central plug 36 of extrusion orifice 10. An axial force, with substantially no torque is produced on drive shaft 5, and since after a few revolutions at the bottom of cup 2, the charge is chopped and softened, and the torque on retractable shaft 5 due to the resistance of the confection diminishes, key-pin 32 disengages curved key-way 29.

Extrusion orifice 10 is made up of an array of individual apertures 38, in close proximity to each other, much like the apertures in a spinnerette. Due to this proximity and to the expansion of the individual streams, the streams fuse together past orifice 10, to form a single stream. Web like support structure 39, of central plug 36, also tends to shear the aggregate additions, with the co-operation of the rotating cutter 13. Multiple aperture orifices can greatly increase the flow resistance of the orifice, without substantially changing the size of the extruded stream. This high impedance to fluid flow is necessary for producing several hundred psi charge pressures, for "high" confection expansion ratios, with a power drive. The number of support webs 39, can be increased to 6 or even 8, for extremely high, pressure can dispensed "whipped cream" like flavored toppings. For chamber pressures over 100 psi, extrusion cup 2 must be made of "heavy" stainless steel.

Increasing the flow resistance of the orifice, also tends to minimize "pre-mixing extrusion". This phenomenon is a typical problem with all open orifice (non shuttered) mixer extruders, to some extent. It is caused by the cutter/sweeper or extruder screw insertion into the charge, developing pressure at the orifice, and extruding some un-mixed charge. An inch or two of this un-mixed extrusion is not considered to be a problem to the consuming public, particularly since it is covered up by the subsequent mixed stream.

To reduce extrusion cup charge pressure, for manual driven extruders, the individual aperture size can be maximized, and the number of support webs 39, can be reduced to 3.

Cutter/sweeper 13 has curved spokes 40, said spokes 40 are substantially tangent to the outside circumference of the cutter; on the inner termination, spokes 40 are substantially tangent to the drive shaft 5 circumference. These rotating spokes 40 co-operate with grooves 9, when cutter 13 has engaged orifice plate 8, drive aggregates in the confection charge, to multiple extrusion apertures 38. A shearing action is imparted upon the aggregates, as spokes 40 rotate past stationary grooves 9. In the preferred embodiment of this invention, there are 3 spokes and 6 grooves, so that there are 18 spoke to groove interactions per revolutions of the cutter. Through channel 41 is formed at the inter-spaces of spokes 40; said channel is only partially cut through at the rim of said disc shaped cutter. At central hub 42 said channels terminate in an inclined plane 43. Said inclined plane structures, evenly spaced around hub 42, results in a structure which highly resembles that of a marine propeller. Inclined planes 43, are located such that their exit ports on the bottom surface of cutter 13, engage multiple extrusion apertures 38. Said rotating inclined planes 43, with the co-operation of webs 39, shear, mix, and help to drive charge 46 and the aggregate additions 47 through extrusion apertures 38. The shearing action is similar to that of a meat grinder (FIG. 6).

In order to facilitate rapid and hygienic loading of extrusion cup 2, various flavors of base confections are stored in disposable cups 44, with covers. These cups have a truncated cone shape, and the charge can easily be squeezed out from the bottom, if air is allowed to enter the bottom of the cup. This may be accomplished several ways: holes or slots may be cut into the bottom region of cup 44, just prior to the extraction process. A special tool may be used for this operation. An air passage-way 45 may be formed into the confection charge, from the top of cup 44 to the bottom central region of disposable storage cup 44. This passage-way prevents the formation of a vacuum pocket, at the bottom of the disposable cup, at the extraction process. The disappearance of passage-way 45 would also indicate the "meltdown" of charge 46 during storage or transportation. An air pocket may be formed at the bottom of cup 44 to provide an air cushion for expansion, at the pinching of the bottom of said cup, for the purposes of easy extraction of charge 46.

For purposes of rapid rinsing of the extrusion chamber and cutter 13, between various flavor processings, and before periods of expected inactivity, "city" water is injected into the closed chamber, through a control valve. This is accomplished by placing a relatively small nozzle 48 into the bottom face of piston 1. A lever operated valve is used for rapid operation, and a dual self sealing quick disconnect coupling is used for the piston connection. A catch pan and drain line is utilized to carry away the wash water.

Quick release "bayonet" mounting of the piston and cylinder to the jaws of the press is used. Cutter 13 is mounted on an integral 5 turn screw. These mounts facilitate rapid dis-assembly and assembly for daily soaking and major cleaning and lubricating of these components.

It will be appreciated by those skilled in the art, that the invention may be carried out in various ways, and may take various forms of embodiments other than those illustrative embodiments heretofore described. Accordingly, it is to be understood that the scope of this invention is not limited by the details of the foregoing description, and I intend by the following claims to cover all modifications within the spirit and scope of my invention.

What I claim to be new and desire to secure by Letters Patent of the United States is:

1. A food mixing, chopping and extruding apparatus comprising:
    a cylindrical cup having an extrusion orifice in its bottom wall, said extrusion orifice comprising a solid core centrally located in said bottom wall and supported by thin web-like members, the spaces between said web-like members forming individual extrusion apertures in close proximity to each other such that extrudate flowing from said apertures join together to form one integral stream;
    a piston cooperating with said cylindrical cup and actuated by a press for pressurizing a food charge;
    and a rotating cutter and agitator device coaxial with said extrusion orifice and mounted on a retractable drive shaft keyed to a drive barrel;
    wherein the apparatus further comprises a spring biasing said drive shaft in the extended position and a torque-actuated detent mechanism to hold said drive shaft in the extended position, whereby torque produced by the resistance of the food charge on the rotating cutter and agitator device actuates said detent mechanism, holding said drive shaft in the extended position.

2. The apparatus as described in claim 1, wherein said detent mechanism comprises a key-pin on said drive shaft inserted into an axially located key-way in said drive barrel, said key-way containing a curved portion at its bottom end associated with the extended position, the curved portion being curved in a direction opposite to the direction of rotation, whereby said key-pin is maintained in said curved portion of said key-way by said torque, and said key-pin is removed from said curved portion as a significant axial force is applied to said drive shaft when said cutter and agitator device engages with the cylindrical cup bottom wall.

3. The apparatus as described in claim 2, wherein said cutter and agitator device includes a centrally located protrusion cooperating with said centrally located solid core of said extrusion orifice to produce said significant axial force.

4. The apparatus as described in claim 1, wherein said cutter and agitator device comprises:
    a central hub;
    curved spokes evenly spaces around said central hub, forming channels in the spaces between said curved spokes; and
    a propeller-like inclined plane structure evenly spaced around said central hub, communicating with the central ends of said channels such that said channels sweep the food charge to said inclined plane structure.

5. The apparatus as described in claim 4, wherein said individual extrusion apertures are connected to grooves in the bottom surface of said cylindrical cup, said grooves cooperating with said curved spokes of said cutter and agitator device to shear aggregates in the food charge and to direct the aggregates to said extrusion apertures.

6. The apparatus as described in claim 1, wherein said piston includes a nozzle connected to a pressurized water supply controlled by a valve, whereby pressurized water is injected into said cylindrical cup to flush and clean said cylindrical cup and said piston after an extrusion cycle.

* * * * *